(12) United States Patent
Jarosz

(10) Patent No.: US 6,832,741 B2
(45) Date of Patent: Dec. 21, 2004

(54) AIRCRAFT SEAT FOOTREST SYSTEM AND METHOD

(76) Inventor: Alicja Jarosz, 20125-28th Ave., West Lynnwood, WA (US) 98036

( * ) Notice: Subject to any disclaimer, the term of this patent is extended or adjusted under 35 U.S.C. 154(b) by 0 days.

(21) Appl. No.: 10/703,703

(22) Filed: Nov. 7, 2003

(65) Prior Publication Data

US 2004/0094668 A1 May 20, 2004

Related U.S. Application Data

(60) Provisional application No. 60/424,853, filed on Nov. 8, 2002.

(51) Int. Cl.[7] ............................................. B64D 11/06
(52) U.S. Cl. ................. 244/122 R; 297/273; 244/118.5
(58) Field of Search ....................... 244/118.5, 122 R; 297/273, 423.15, 423.25, 423.1, 423.4

(56) References Cited

U.S. PATENT DOCUMENTS

| 402,130 | A | * | 4/1889 | Bedford ...................... 297/273 |
| 1,218,876 | A | * | 3/1917 | Liverson ........................ 5/630 |
| 3,744,843 | A | * | 7/1973 | Barecki et al. ............. 297/316 |
| 3,746,392 | A | * | 7/1973 | German ...................... 297/380 |
| 4,013,318 | A | * | 3/1977 | Piper ....................... 297/423.4 |
| 5,188,383 | A | * | 2/1993 | Thompson ............... 280/250.1 |
| 5,207,481 | A | * | 5/1993 | Ayala et al. ................. 297/464 |
| 5,556,167 | A | * | 9/1996 | Johnson Siemion ... 297/423.15 |

* cited by examiner

Primary Examiner—Galen Barefoot
(74) Attorney, Agent, or Firm—Dean A. Craine

(57) ABSTRACT

A footrest system for supporting the user's feet in the storage space located under an aircraft seat. The system comprises a foot pad with longitudinally aligned strap members that extend from it's opposite ends. Attached to the distal ends of the two strap members are clip's that selectively attaches the strap member to the framework or underside surface of seat or to a portable stand that may be included with the system. In one embodiment, the strap member includes a buckle that enables the user to adjust the length of the strap member.

8 Claims, 4 Drawing Sheets

AIRCRAFT SEAT FOOTREST SYSTEM AND METHOD

This utility patent application is based on the provisional patent application (Application No. 60/424,853) filed on Nov. 8, 2002.

BACKGROUND OF THE INVENTION

1. Field of the Invention

This invention pertains to footrests, and more particularly, to portable footrests designed to be used under an aircraft seat located in front of the user.

2. Description of the Related Art

It is well known that there is less leg space for "coach class" travelers than "first class" travelers on aircrafts. While the seat designs and arrangements in the "coach class" meet minimum human factors recommendations, the small amount of leg space can be very uncomfortable to the traveler.

Fixed footrests, located under a seat for a user seated behind the seat to use, are relatively common in churches and movie theaters. Typically, such footrests consist of a horizontal bar or shelf located under the seat so that the user end other individuals may easily step through the aisle located between the rows seats.

In the "coach class" section of an aircraft, the width of the aisle between seats is 12 to 15 inches. The space located under the seat in front of each passenger, called the "carry on storage space", must remain open and uncluttered when initially loading the aircraft so that hand-carried items may be easily stored therein.

What is needed is a portable footrest that selectively and temporarily attaches under an aircraft seat and disposed in the storage space under the seat so that it does not extend into or block movement through the aisle. The footrest should be removable so that it does not prevent items from being placed in the "carry on storage space" under the seat.

SUMMARY OF THE INVENTION

It is an object of the present invention to provide a footrest system for the storage space located under an aircraft seat.

This and other objects are met by the present invention which comprises a foot pad with an adjustable strap designed to hold the foot pad in a horizontal, suspended position in the carry on storage space under the front seat. Attached to the distal ends of the strap is a means for temporarily attaching the strap to the seat's legs or underside surface. In one embodiment, the means for selectively attaching the distal ends of the strap is a D-ring that connects to a ring member or clip securely attached to the seat's legs or underside surface. Also included is an optional folding stand that can be easily assembled and used under the seat for use with the footrest when the ring member or clip is not available or accessible.

DESCRIPTION OF THE PREFERRED EMBODIMENT(S)

Figure 1:
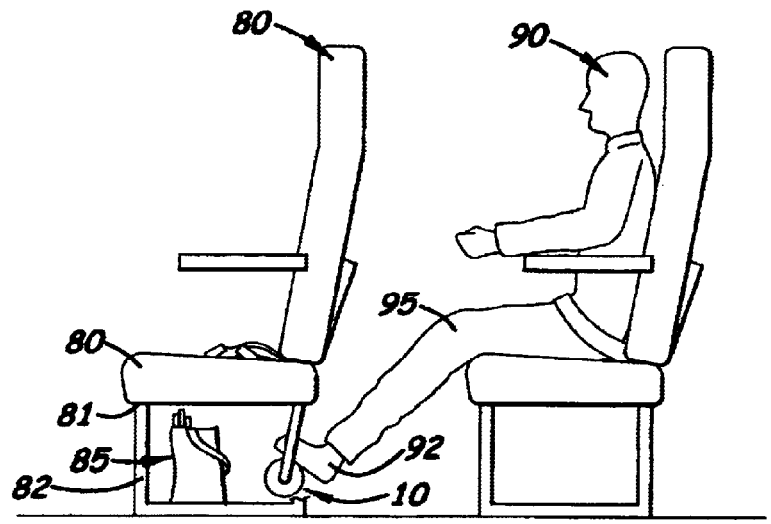
FIG. 1 is a side elevational view of two aircraft seats located in "coach class" in an aircraft.

There is shown in the accompanying Figs., a footrest system 9 that includes a footrest 10 designed to fit in the carry on storage space 85 located on a typical aircraft passenger seat. The footrest 10 comprises an elongated foot pad 20 made of soft, flexible material with two straps 30, 40 attached to its opposite ends 26, 28. Attached to the distal ends 31, 41 of the two straps 30, 40 is a means for selectively attaching the distal ends 31, 41 to a ring member or clip attached to the seat's legs 81 or underside surface 82. In the Figs., the means for selectively attaching the distal ends 31, 41 are two D-rings 50, 50' capable of being easily connected to two ring members 60, 60' attached to the legs 81 or surface 82. An adjustable buckle 52 may be attached to the straps 30, 40 that enables the length of the straps 30, 40 to be shortened or lengthened.

Figure 2:
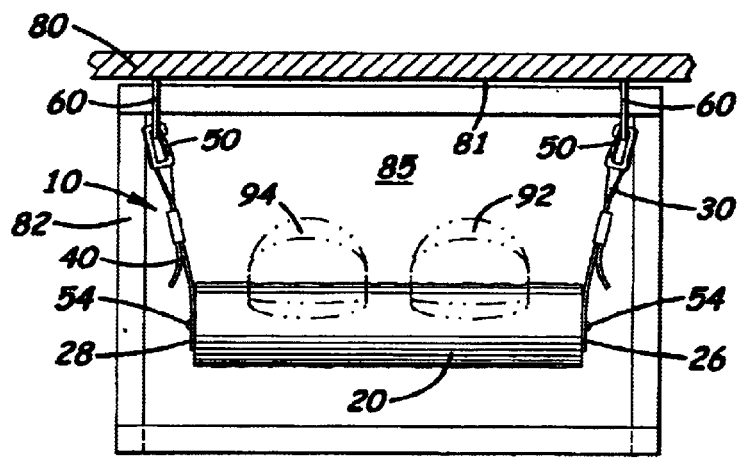
FIG. 2 is a rear elevational view of the invention shown attached to the framework under an aircraft seat.
Figure 3:
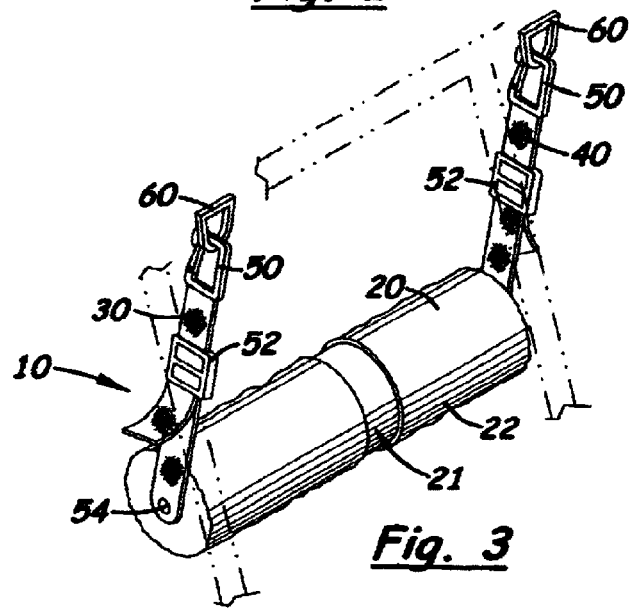
FIG. 3 is a perspective elevational view of the invention shown in FIG. 2.
Figure 4:
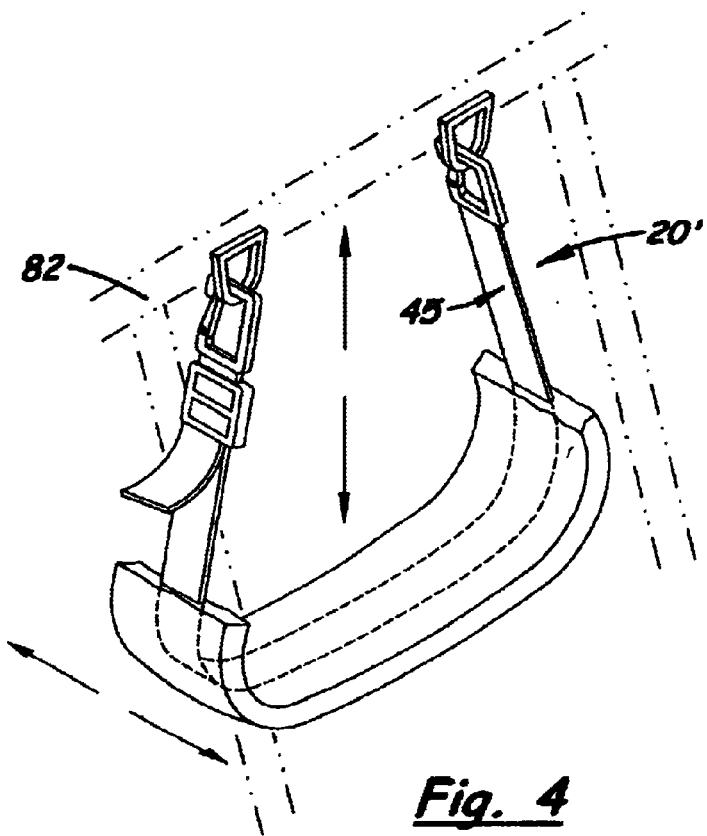
FIG. 4 is a perspective view of a second embodiment of the invention shown used under a seat.
Figure 5:
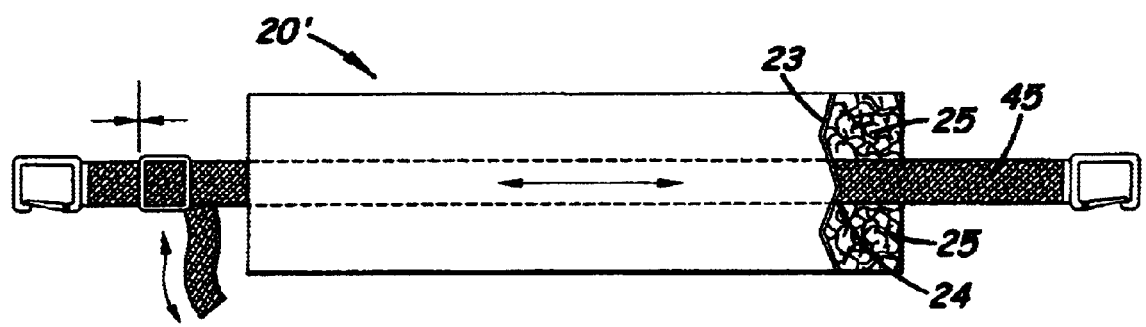
FIG. 5 is a top plan view of the second embodiment of the invention shown in FIG. 4.
Figure 6:
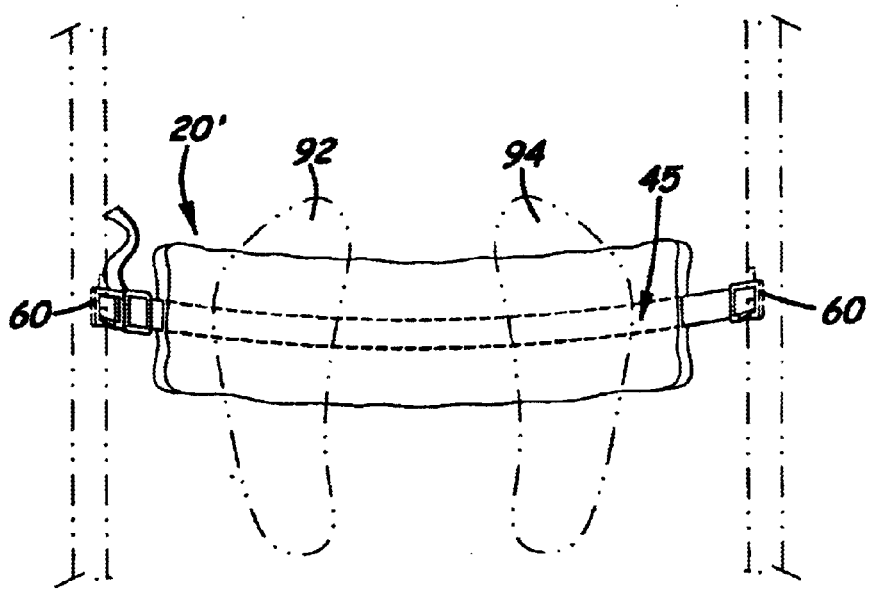
FIG. 6 is a top plan view of the second embodiment of the invention shown in FIGS. 4 and 5 showing the location of a user's two feet.
Figure 7:
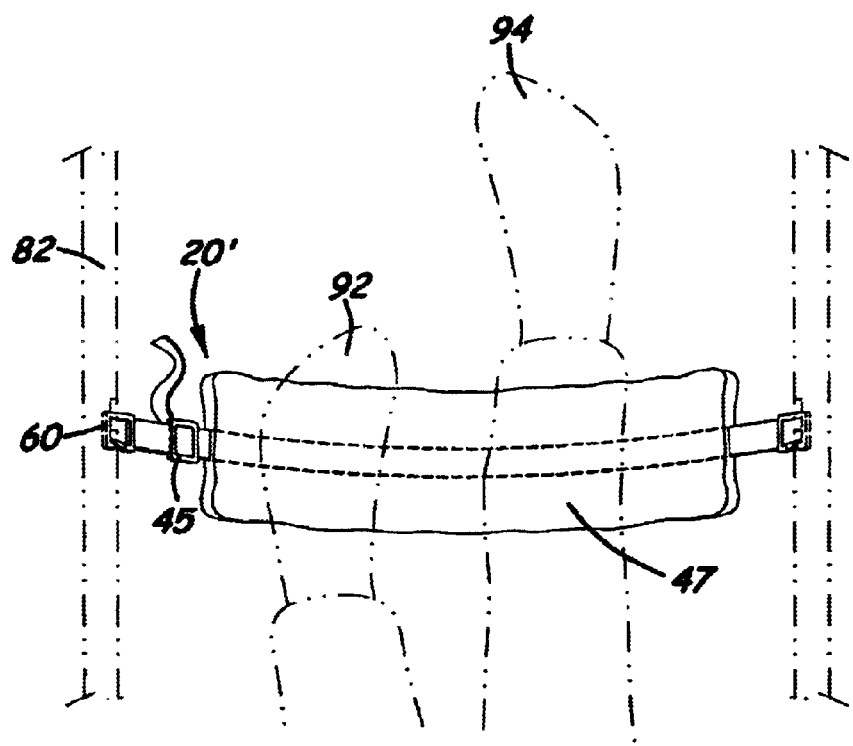
FIG. 7 is a top plan view similar to the view shown in FIG. 6 with the device used to support the user's calf when one leg is straightened and the foot of the other leg bent at the knee.

In the first embodiment shown in FIGS. 1–3, the foot pad 20 is cylindrical and approximately 18 inches in length and 2 inches in diameter. The foot pad 20 includes an inner foam member 21, covered with a washable outer sleeve member 22. A suitable connecter, such as a bolt 54, is used to attach the proximal ends 32, 42 of the straps 30, 40 to the ends 26, 28 respectively of the foot pad 20.

FIGS. 4–7 show a second embodiment of the foot pad, denoted 20', that is a flat, rectangular structure with a longitudinally aligned passageway 24 formed therein that receives a single strap 45 that is able to slide freely there through. The foot pad 20' may be made of vinyl or nylon material 23 partially filled with foam 25. Foot pad 20' measures approximately 18 inches in length and 4 inches in width.

The straps 30, 40, and 45 may be made of non-stretchable or stretchable material. In the first embodiment, the straps 30, 40 are approximately 15 inches in length. In the second embodiment, the strap 45 is approximately 36 inches in length.

As mentioned above, the two ring members 60, 60' are rigidly attached to the legs 81 or underside surface 82 of the seat 80. The D-rings 50, 50' on straps 30, 40, 45 are loosely attached to the two ring members 60, 60' so that the foot pad 20, 20' may swing under the front seat 80. The length of the straps 30, 40, 45 may be adjusted so that the user 90 may use the foot pad 20, 20' to support his or her foot 92, 94 or calves 47 (one shown). The swinging movement of the foot pad 20, 20' under the seat 80 enables the user 90 to stretch or move his or her legs to a bent or a straight knee position.

Figure 8:
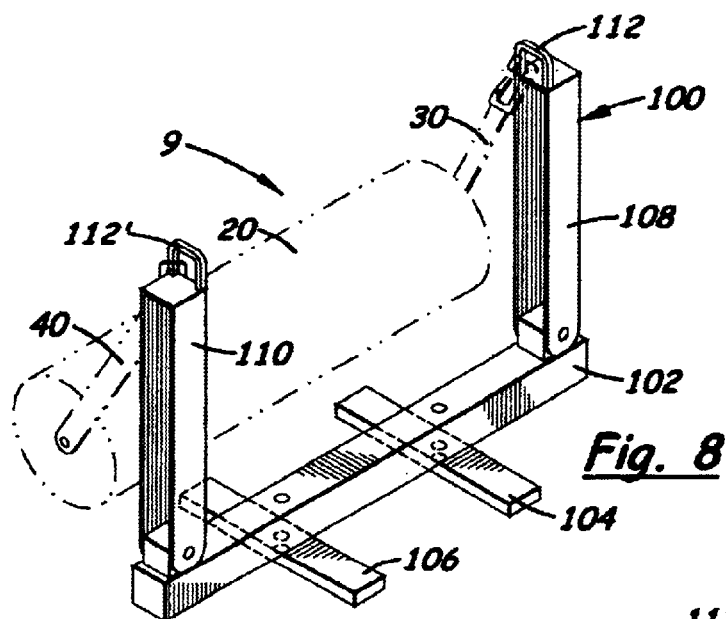
FIG. 8 is a perspective view of a portable stand designed to be used with the footrest.
Figure 9:
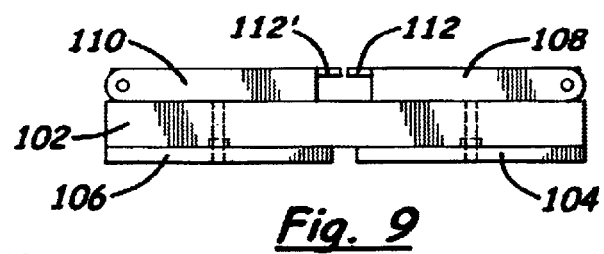
FIG. 9 is a side elevational view of the portable stand folding into a compact configuration

The footrest system 9 also may include an optional portable stand, designed to be easily assembled and used under the aircraft seat 80 and used with the ring members or clips attached to the seat are not available or not accessible. The first embodiment of the portable stand, designated 100, and shown in FIGS. 8–9, includes a main frame member 102 with two pivoting leg members 104, 106 designed to move between a longitudinally aligned position and a perpendicularly aligned lateral position. Attached to the opposite ends of the main frame member 102 are two diagonally aligned, pivoting arms 108, 110. During assembly, the arms 108, 110 swing upward from a longitudinally aligned position over the main frame member 102 to an upward, diagonally aligned position. Attached to the distal ends 109, 111 of the two arms 108, 110, respectively, are two rings 112, 112' that attach to straps 30, 40.

Figure 10:
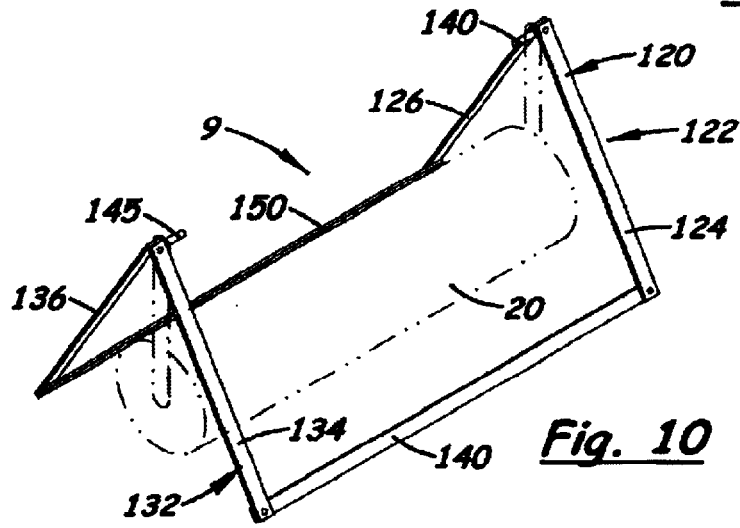
FIG. 10 is a perspective view of another embodiment of the portable stand.
Figure 11:
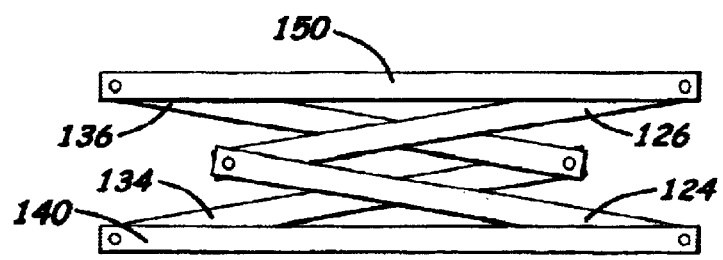
FIG. 11 is a side elevational view of the stand showing in FIG. 10 folded into a compact configuration.

FIGS. 10 and 11 show a second embodiment of the portable stand, designated 120, that includes two v-shaped leg members 122, 132 attached to two longitudinally lower base members 140, 150. The v-shaped leg members 122, 132 are made of two diagonal members 124, 126 and 134, 136 pivotally connected together at one end. The opposite end of the leg members 122, 124 and 132, 134 are pivotally attached to the lower base members 140, 150. respectfully. Attached to the apex on the interconnected v-shaped leg members 124, 126 and 134, 136 is a connecting rod 140, 145, respectively, that attaches to the ends of the straps 30, 40 or 45.

Using the above invention is a method of supporting a user's 90 legs 95 while traveling on an aircraft comprising the following steps:

a. selecting a footrest 10 that includes an elongated foot pad 20, two straps 30, 40 attached to the opposite ends 26, 28 of the foot pad 20, and means for temporarily attaching the ends 31, 41 of the strap 30, 40 to the aircraft seat 80 to suspend the foot pad 20 in the storage space 85 under the aircraft seat 80;

b. attaching the straps 30, 40 to the aircraft seat 80 or stand 100 or 120 assembled in the storage space 85 to horizontally suspend the foot pad in the storage space 85;

c. resting one or more feet 92, 94 on the foot pad 20.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A footrest system, comprising;
   a. an elongated foot pad;
   b. a removable strap means for suspending said root pad in a horizontal position in the storage space located under an aircraft seat; and,
   c. means for removably attaching said strap means under an aircraft seat so that when said strap means is attached to said foot paid, said foot pad is horizontally suspended in the storage space.

2. The system, as recited in claim 1, wherein said means for removably attaching said strap means in an elevated position under an aircraft seat is a ring member attached to the aircraft seat that selectively attaches to said strap means.

3. The footrest system, as recited in claim 1, wherein said strap means includes two straps each said strap including a distal end and a proximal end, said distal end attaching to an aircraft seat and said distal end attaching to an opposite end on said foot pad.

4. The footrest system, as recited in claim 3, further including a means to adjust the length of each said strap to adjust the height of said foot pad disposed inside the storage space.

5. The footrest system, as recited in claim 4, further including a D-ring attached to said distal end of each said strap to selectively attached said strap to said aircraft seat.

6. The footrest system, as recited in claim 1, wherein said strap means includes one strap that extends through said foot pad that attaches at its opposite ends to said aircraft seat.

7. A method of supporting a user's foot or legs while traveling on an aircraft comprising the following steps:
   a. selecting a footrest that includes an elongated foot pad, a strap means attached to said foot pad, and means for temporarily attaching said strap means under said aircraft seat to horizontally suspend said foot pad in the storage space located thereunder;
   b. attaching the straps means to the aircraft seat to suspend the foot pad thereunder; and,
   c. resting one or more feet or legs on said foot pad.

8. The method of supporting a user's root or legs as recited in claim 7, further including the step of assembling a portable stand inside the storage space and attaching said strap means thereto to suspend said foot pad in said storage space.

* * * * *

UNITED STATES PATENT AND TRADEMARK OFFICE
CERTIFICATE OF CORRECTION

PATENT NO.    : 6,832,741 B2
DATED         : December 21, 2004
INVENTOR(S)   : Alicja Jarosz It is certified that error appears in the above-identified patent and that said Letters Patent is hereby corrected as shown below:

Column 4,
Line 44, please replace "root" with -- foot --.

Signed and Sealed this

Sixteenth Day of August, 2005

JON W. DUDAS
*Director of the United States Patent and Trademark Office*